US009078175B2

(12) United States Patent
Yang et al.

(10) Patent No.: US 9,078,175 B2
(45) Date of Patent: Jul. 7, 2015

(54) EXTENDED QOS SUPPORT IN EPC

(75) Inventors: Yong Yang, Mölndal (SE); Josefin Karlsson, Torslanda (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 524 days.

(21) Appl. No.: 13/315,384

(22) Filed: Dec. 9, 2011

(65) Prior Publication Data

US 2012/0147767 A1 Jun. 14, 2012

Related U.S. Application Data

(63) Continuation of application No. PCT/EP2011/072220, filed on Dec. 8, 2011.

(60) Provisional application No. 61/422,276, filed on Dec. 13, 2010.

(51) Int. Cl.
*H04W 36/00* (2009.01)
*H04W 28/24* (2009.01)

(52) U.S. Cl.
CPC .......... *H04W 36/0044* (2013.01); *H04W 28/24* (2013.01)

(58) Field of Classification Search
CPC . H04W 72/0406; H04W 28/22; H04W 28/24; H04W 36/0044; H04W 36/0033; H04W 36/0066; H04W 36/14
See application file for complete search history.

(56) References Cited

U.S. PATENT DOCUMENTS

| 2008/0259873 | A1 | 10/2008 | Ahmavaara |
| 2009/0262707 | A1* | 10/2009 | Wu et al. .................. 370/332 |
| 2009/0316656 | A1* | 12/2009 | Zhao et al. ............... 370/331 |

FOREIGN PATENT DOCUMENTS

WO WO 2010020637 A1 2/2010

OTHER PUBLICATIONS

3GPP TS 23.401 V9.6.0 (Sep. 2010) 3rd Generation Partnership Project; Technical Specification Group Services and System Aspects; General Packet Radio Service (GPRS) enhancements for Evolved Universal Terrestrial Radio Access Network (E-UTRAN) access (Release 9), Sep. 29, 2010, pp. 140-141, 147 and 174-176.*
NTT Docomo "Modifying and rejecting bearer level QoS parameter for default bearer", 3GPP TSG SA Meeting #81, S2-105194, Oct. 11-15, 2010, Prague, Czech Republic.*
NTT Docomo et al. "Modifying and Rejecting bearer level QoS parameter for default bearer" 3GPP TSG SA Meeting #80, S2-104010, Aug. 30-Sep. 3, 2010, Brunstad, Norway.*
Huawei et al. "Correction for AMBR handling", 3GPP TSG SA WG2 Meeting #82, S2-105971, Nov. 15-19, 2010.*

* cited by examiner

*Primary Examiner* — Joseph Bednash
(74) *Attorney, Agent, or Firm* — Rothwell, Figg, Ernst & Manbeck, P.C.

(57) ABSTRACT

Example embodiments presented herein are directed towards a target Mobility Management Entity (MME) or a target Serving General Packet Radio Service Support Node (SGSN) network node, and method, for handling a mobility procedure or session procedure within the same operator. The roaming agreement handling may comprise comparing a Quality of Service (QoS) parameter associated with a source system, a maximum QoS associated with a target system and a Packet Data Network Gateway (PGW) or Policy and Changing Rules Function (PCRF) capability. The mobility procedure or session procedure handling may further comprise providing instructions for the roaming procedure based on the comparison.
Example embodiments may further comprise a Packet Data Network Gateway (PGW) network node, and method, for adjusting Quality of Service (QoS) during a mobility procedure or session procedure. The adjustment may be based on a received target maximum QoS.

25 Claims, 8 Drawing Sheets

EXTENDED QOS SUPPORT IN EPC

RELATED APPLICATIONS

This application claims the benefit of U.S. Provisional Application No. 61/422,276, filed on Dec. 13, 2010. This application is also a continuation of International Application No. PCT/EP2011/072220, filed on Dec. 8, 2011, which also claims priority to U.S. Provisional Application No. 61/422,276, filed on Dec. 13, 2010. The entire teachings of the above applications are incorporated herein by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

Mobility management is an important function in maintaining cellular networks. The goal of mobility management is to track where cellular phones, or user equipments, are located in order for mobile phone services to be provided to the various user equipments comprised in any given network. The network nodes which are primarily responsible for mobility management are the Mobility Management Entity (MME) and the Serving General Packet Radio Service Support Node (SGSN).

SUMMARY

Current 3GPP specifications only allow for the MME/S4-SGSN to downgrade subscribed-ARP and APN-AMBR received from the HSS before forwarding this information to the SGW and onwards to the PGW during attach. In 3GPP, it is not clear how to handle mobility procedures, other than Attach, for user equipment requests (e.g., a standalone user equipment requested PDN connectivity request). In the present specification the HPLMN should not upgrade bearer level QoS or APN-AMBR above this provided value during a Tracking Area Update, Routing Area Update or a handover procedure or there will be a risk that the MME or SGSN will reject the bearer establishment or even detach the user equipment.

Thus, an object of the example embodiments presented herein may be to provide improved handling of mobility procedures or session procedures. Accordingly, some of the example embodiments may be directed towards a method in a target Mobility Management Entity (MME) or a target Serving General Packet Radio Service Support (SGSN) node for handling a mobility procedure or session procedure, the target MME node or the target SGSN node being comprised in a radio network. The method comprises receiving, from a source MME node or a source SGSN node, a communication message comprising a QoS parameter associated with a source serving network system. The communication message further comprises a Packet Data Network Gateway (PGW) or a Policy and Charging Rules Function (PCRF) capability information element, where the capability information element indicates if a PGW or PCRF node supports maximum QoS handling. The method further comprises comparing a maximum allowed QoS of a target serving network, the QoS parameter associated with the source serving network and the capability information element. The method also comprises providing instructions for the mobility procedure or session procedure for each Packet Data Network (PDN) connection associated with a requesting user equipment, the instructions being based the comparing.

Some example embodiments may be directed towards a method in a Packet Data Network Gateway (PGW) node for adjusting Quality of Service (QoS) during a mobility procedure or session procedure, the PGW node being comprised in a radio network. The method comprises receiving instructions, from a target Mobility Management Entity (MME) or a target Serving General Packet Radio Service Support Node (SGSN), for adjusting an allowed QoS associated with a PDN connection of a user equipment requesting the mobility procedure or session procedure. The instructions comprise a maximum allowed QoS of a target serving network and a QoS parameter associated with a source serving network. The method also comprises adjusting a QoS associated with the PDN connection of the user equipment based on the maximum allowed QoS of the target serving network and the QoS parameter associated with the source serving network.

Some example embodiments may be directed towards a target Mobility Management Entity (MME) or a target Serving General Packet Radio Service Support (SGSN) node for handling a mobility procedure or session procedure, the target MME node or the target SGSN node being comprised in a radio network. The node comprises a receiving port configured to receive, from a source MME node or a source SGSN node, a communication message comprising a QoS parameter associated with a source serving network system. The communication message further comprises a Packet Data Network Gateway (PGW) or a Policy and Charging Rules Function (PCRF) capability information element, where the capability information element indicates if a PGW or PCRF node supports maximum QoS handling. The node further comprises a comparing unit configured to compare a maximum allowed QoS of a target serving network, the QoS parameter associated with the source serving network and the capability information element. The node also comprises an instructions unit configured to provide instructions for the mobility procedure or session procedure for each Packet Data Network (PDN) connection associated with a requesting user equipment, the instructions being based on the comparison.

Some example embodiments may also be directed towards a Packet Data Network Gateway (PGW) node for adjusting Quality of Service (QoS) during a mobility procedure or session procedure, the PGW node being comprised in a radio network. The node comprises a receiving port configured to receive instructions, from a target Mobility Management Entity (MME) or a target Serving General Packet Radio Service Support Node (SGSN), for adjusting an allowed QoS associated with a PDN connection of a user equipment requesting the mobility procedure or session procedure. The instructions comprise a maximum allowed QoS of a target serving network and a QoS parameter associated with a source serving network. The node further comprises an adjusting unit configured to adjust a QoS associated with the PDN connection of the user equipment based on the maximum allowed QoS of the target serving network and the QoS parameter associated with the source serving network.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
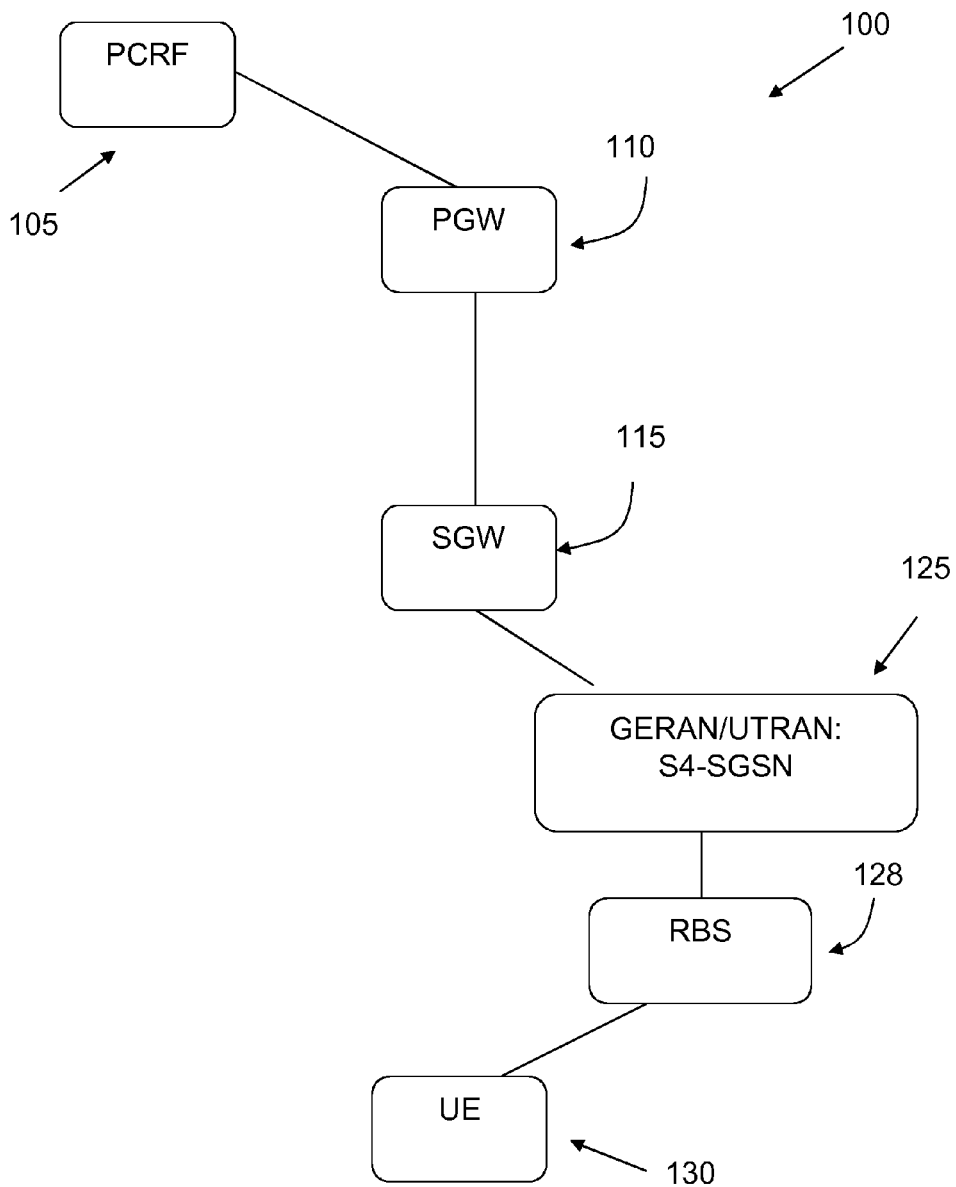
FIGS. 1 and 2 are schematic examples of wireless networks.

FIG. 1 shows a schematic view of a first system 100 in which some of the example embodiments may be applied. The system 100 is a so called 2G/3G system, also sometimes referred to as a GERAN/UTRAN system. As shown, the system 100 can accommodate a number of user equipments one of which is shown as an example, with the reference number 130. Naturally, the system 100 can accommodate a large number of user equipments and is not limited to accommodating only one user equipment.

All traffic to and from the user equipment 130 is routed via a so called "base station", which, depending on the nature of the system, has different names. In the case of a GERAN/UTRAN system such as the one in FIG. 1, the base station is in this text referred to by the generic name "Radio Base Station", here and in FIG. 1 abbreviated as RBS. The RBS which the user equipment 130 is connected to is shown in FIG. 1 as RBS 128. One example of a system specific name for an RBS is NodeB, as used in 3G systems, and another example is BTS, Base Transceiver System, as used in some 2G systems.

Regardless of the kind of system, the mobility of the user equipment 130 is controlled by what will here initially be referred to generically as a "mobility management node", which, as shown in FIG. 1, in the case of GERAN/UTRAN is a so called S4-SGSN, shown as 125 in FIG. 1.

The "mobility management node" is connected to a Serving Gateway, an SGW 115, which in turn is connected to a PDN Gateway, PGW 110. The PGW 110 can be connected to a unit or a function for Policy and Charging Rules Function, a so called PCRF 105, or the PGW 110 can be arranged to take certain policy and charging actions on its own without the use of a PCRF.

Figure 2:
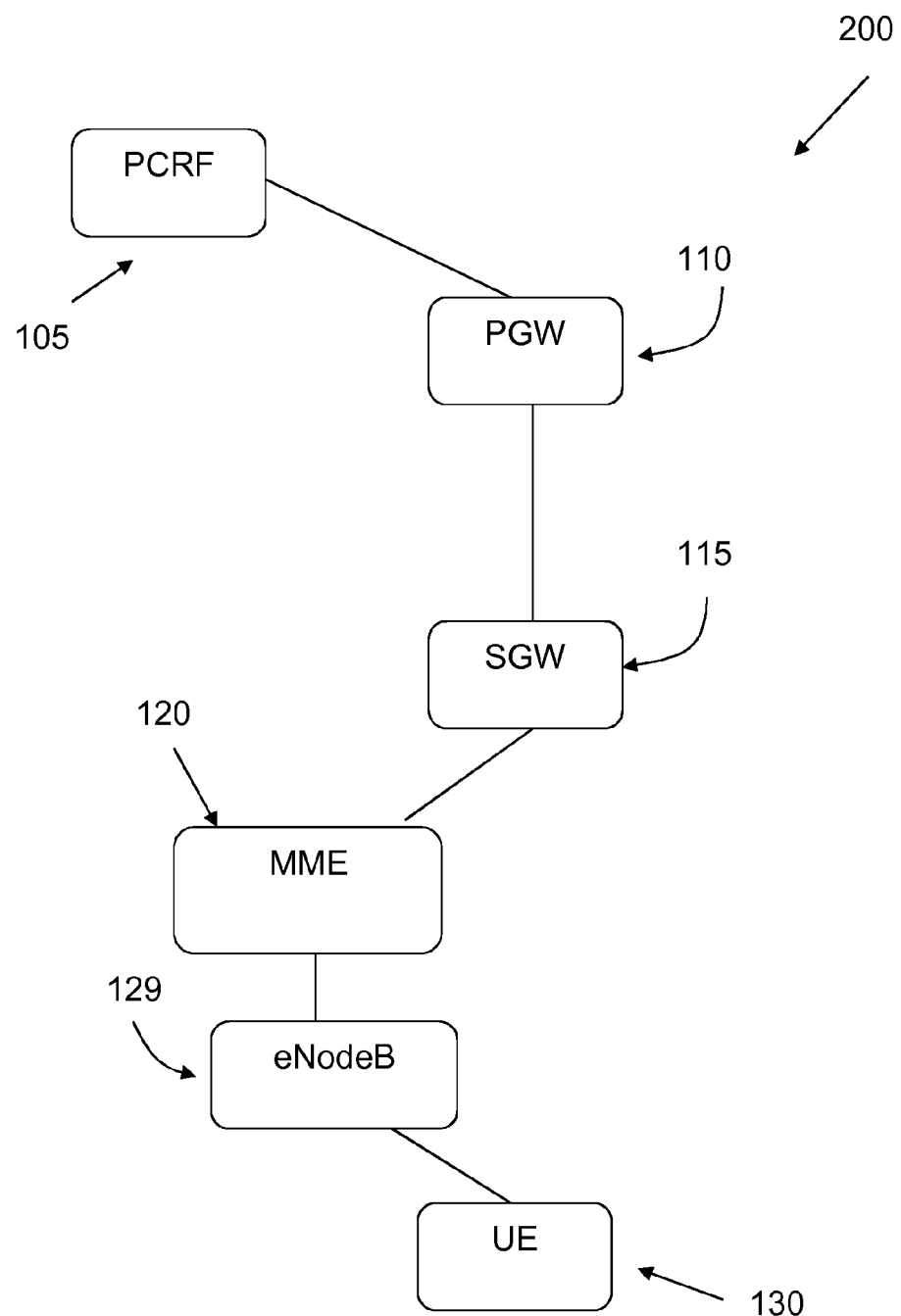

FIG. 2 shows a schematic overview of a second system 200 in which the invention can be applied. The system 200 is a so called LTE based system, also referred to as an EUTRAN system. It should be pointed out that the terms "LTE" and "LTE based" system is here used to include both present and future LTE based systems, such as, for example, advanced LTE systems.

In a EUTRAN system such as the one 200 in FIG. 2, the "base station" is referred to as an eNodeB, shown as 129 in FIG. 2. The "mobility management node" is in a EUTRAN system referred to as a Mobility Management Entity (MME) shown as 120 on FIG. 2. The SGW and PGW of the system in FIG. 2 are similar to those in FIG. 1, and will for that reason not be described again here, which is also the case for the PCRF 105.

It should be appreciated that although FIG. 1 shows a system 100 which is a GERAN/UTRAN system and FIG. 2 shows a system 200 which is an EUTRAN system, the invention can also be applied in systems which combine these two technologies, i.e. combined GERAN/UTRAN and EUTRAN systems.

Example embodiments are presented herein to provide improved handling during mobility procedures in radio networks. As a part of the solution according to the example embodiments discussed herein, problems with current solutions will be identified and discussed.

Figure 3:
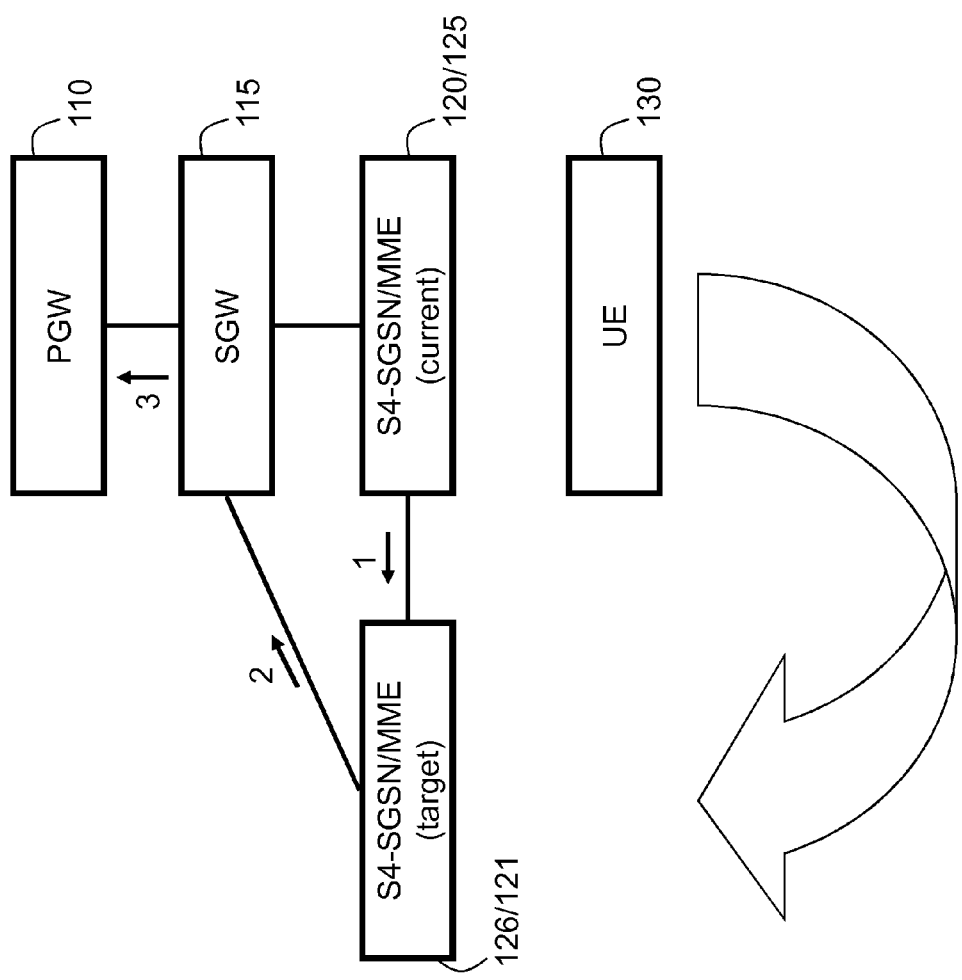
FIG. 3 is an illustrative example of a mobility procedure.

FIG. 3 illustrates a mobility procedure which may occur in any of the wireless systems shown in FIG. 1 or 2. As shown in FIG. 3, a user equipment 130 may be associated with a source serving system featuring a source MME 120 or S4-SGSN 125. During a mobility procedure (e.g., a handover procedure) the user equipment 130 may move to a target system. The target system may comprise a target MME 121 or a target S4-SGSN 126.

In establishing a connection with the target system, the source MME 120 or the source S4-SGSN 125 may send a communication message to the target MME 121 or the target S4-SGSN 126 (message 1). The communication message may comprise a maximum QoS associated with the source MME 120 or the source S4-SGSN 125. The target MME 121 or the target S4-SGSN 126 may thereafter evaluate the maximum QoS associated with the source system with the QoS capabilities of the target MME 121 or the target S4-SGSN 126.

If the maximum QoS associated with the target MME 121 or the target S4-SGSN 126 is lower or higher than the maximum QoS associated with the source MME 120 or the source S4-SGSN 125, the target MME 121 or the target S4-SGSN 126 may send a request to the PGW or PCRF network node, via the SGW network node, to see if the QoS parameters of the target system may be re-authorized (messages 2 and 3). If the PGW is unable to support the QoS level, than the mobility procedure will be stopped.

At least two things are missing in the current specification. First, when a user equipment moves from one operator's network (e.g., a source network) to another operator's network (e.g., a target network) without loosing connectivity (e.g., during S1-based EUTRAN handover or at handover between E-UTRAN, UTRAN and GERAN) the present 3GPP standards lacks the means for the target operator network to communicate the maximum allowed QoS that is in-line with roaming agreements with the PGW (and the PCRF for the case of a dynamic PCC being deployed).

Second, the scenario of when the maximum allowed QoS that can be requested by a HPLMN operator (e.g., a source maximum QoS) exceeds the subscribed QoS of a user equipment (e.g., a target maximum QoS) is currently not specified in the 3GPP standard. In the present specification, a MME may downgrade a subscribed QoS before sending roaming procedure communications to the SGW and PGW network nodes. If the subscribed QoS (target) is lower than the maximum allowed QoS (source) of the serving network, the present 3GPP standard lacks the means for the VPLMN operator to unambiguously communicate both the subscribed QoS of the end user and the maximum allowed QoS of the serving network to the HPLMN core network.

For example, if the maximum allowed APN-AMBR that a roaming user may be assigned is 10 Mbps in a VPLMN but the subscribed APN-AMBR is 2 Mbps, then the MME, in the VPLMN, can not indicate to the HPLMN the maximum of 10 Mbps by changing the subscribed QoS since the subscribed QoS is already lower than 10 Mbps.

In addition, the general lack of QoS re-negotiation functionality in the EPC has a major disadvantage also for non-roaming cases. When a PDN-connection is handed over from one system, e.g., EUTRAN to another system, UTRAN or GERAN, it is not certain that the target system can actually support the QoS of the bearers in that PDN-connection. For example, the data rates of LTE-advanced (specified in 3GPP release 10) are superior to the data rates of ordinary LTE (specified in 3GPP release 8 and release 9), not to mention the possible data rates of HSPA, UMTS and GPRS. In a mobility scenario from a source system where superior data rates are supported to a target system with lower QoS capabilities, the target system will not be able to establish the required bearers. Since QoS negotiations are not supported in the EPC, the target system may have no other option but to either deactivate the bearers with too high QoS or alternatively to reject the handover procedure. As a consequence bearers will be lost or the user may even be detached.

Other examples of specific problems with user equipment roaming may also include an user equipment moving from an old or source MME/S4-SGSN to a new or target MME/S4-SGSN, where it may not be possible to reflect to the target MME/S4-SGSN if the PGW, and optionally PCRF, supports the maximum allowed QoS value or not. Therefore, the target MME/S4-SGSN will try to send maximum allowed QoS, which may be configured in the target MME/S4-SGSN, in different control messages towards PGW/PCRF. In some situations, the target MME/S4-SGSN will reject the control procedure because some of the selected QoS values are above the target maximum allowed QoS values.

Furthermore, there is no use for the target MME/S4-SGSN to send the maximum allowed QoS to the PGW/PCRF network node, if the maximum allowed QoS is not supported by PGW/PCRF. For this situation a reject by the target MME/S4-SGSN may occur.

If the maximum allowed QoS, configured in the target MME/S4-SGSN, is different than the values used by the PGW/PCRF, there is no use for the target MME/S4-SGSN to send the maximum allowed QoS to the PGW/PCRF if the maximum allowed QoS is not supported by the PGW/PCRF. Thus, there may not be a reason for the target MME/S4-SGSN to send the maximum allowed QoS to PGW/PCRF during following procedures, for example:

Attach in 3GPP TS 23.401;
User equipment requested PDN Connectivity in 3GPP TS 23.401;
Primary PDP Context activation in 3GPP TS 23.060;
Routing Area Update procedures and Tracking Area Update procedures such as:
    RAU and TAU procedures with and without SGW change in 3GPP TS 23.401; and
    RAU procedure in 3GPP TS 23.401;
    RAU procedures in 3GPP TS 23.060;
Gn/Gp-SGSN to MME TAU in 3GPP TS 23.401;
Handover procedures such as:
    S1 based handover procedure and IRAT handover procedure, both with and without SGW change in 3GPP TS 23.401; and
    3G SGSN (Gn/Gp-SGSN) to MME combined hard handover and SRNS relocation procedure in 3GPP TS 23.401;
    MME to 3G SGSN (Gn/Gp-SGSN) combined hard handover and SRNS relocation procedure in 3GPP TS 23.401
S4-SGSN based SRNS relocation procedure in 3GPP TS 23.060; and
PS handover procedure in 3GPP TS 43.129.

Figure 4:
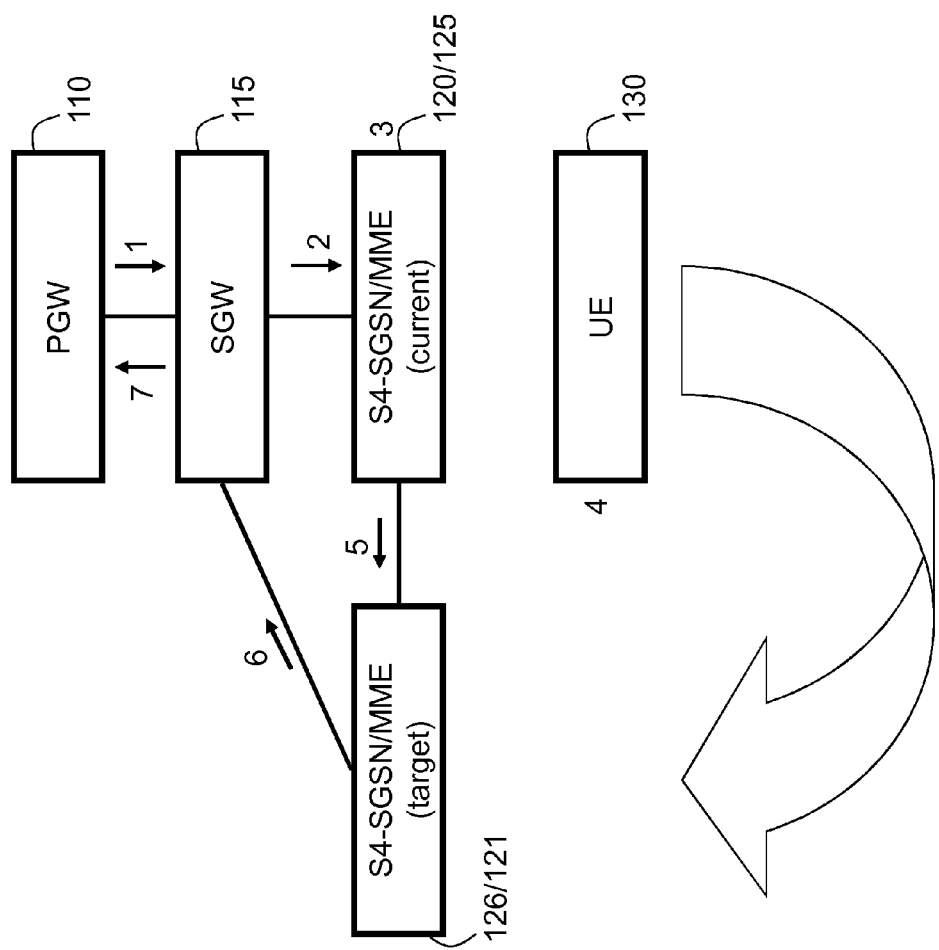
FIG. 4 is an illustrative example of a mobility procedure, according to some of the example embodiments.

Thus, example embodiments presented herein solve the above mentioned problems and provide improved handling in mobility procedures. FIG. 4 illustrates a mobility procedure according to some of the example embodiments.

First, a PGW or PCRF capability or the PGW/PCRF support of max allowed QoS feature may be sent from a PCRF or a PGW 110 to a MME 120 or S4-SGSN 125 in, for example, s5/s8 and s11/s4 interfaces (messages 1 and 2). The PGW or PCRF capability may indicate if the PGW or the PCRF may support QoS handling according to some of the example embodiments. As an example, the PGW/PCRF capability may be sent in the following messages Create Session Response, Modify Bearer Response, Create Bearer Response, Update Bearer Request and/or Delete Bearer Request. It should be appreciated that the PGW/PCRF capability may be sent in the form of an information element or any other equivalent form known in the art.

Thereafter, the MME 120 or the S4-SGSN 125 may store the PGW/PCRF capability information element to be utilized when a user equipment moves to another MME or S4-SGSN during a mobility procedure (message 3).

Once a mobility request is made by a user equipment 130 (e.g., using a Tracking Area Update procedure, Routing Area Update procedure, or a 51 based handover procedure) (message 4), the source MME 120 or the source S4-SGSN 125 may forward the PGW/PCRF capability information element to a target MME 121 or a target S4-SGSN 126, for example, in s3, s10 and s16 interfaces (message 5). The PGW/PCRF capability information element may be sent in the following massages Context Response/SGSN Context Response, Identity Response, or a Forward Relocation Request.

The target MME 121 or the target S4-SGSN 126 may send to the PGW 110, via the SGW 115, the maximum allowed QoS in the target system, for example, in s11/S4 interfaces (messages 6 and 7). The target maximum allowed QoS may be sent in the following massages Modify Bearer Request (for the case when there is no SGW change) or Create Session Request (for the case when there is a SGW change).

Whether the target maximum allowed QoS is included in the s11/S4 messages or not may depend on the received PGW/PCRF capability information element. For example, if the PGW/PCRF capability information element indicates QoS handling is not supported by the PGW/PCRF, there may not be a need to include the target maximum allowed QoS in a message to the PGW/PCRF.

Thus, via message 7, the SGW 115 may, based on the target maximum allowed QoS, change (if the S4-SGSN/MME has been changed) trigger s5/s8 signaling (i.e., a Modify Bearer Request comprising the target maximum allowed QoS to PGW/PCRF). This s5/s8 signaling is a new SGW behavior and is not stated in the 3GPP standard. The reason for sending the new or target maximum allowed QoS value, which may be defined in the target S4-SGSN/MME, is to let the PGW/PCRF have the new maximum allowed QoS which is valid in this serving network. It should be appreciated that the evaluation procedure described above may be made for each PDN connection associated with the user equipment 130 involved in the roaming procedure. This separate evaluation may be useful as each PDN connection may be a different associated QoS value.

Figure 5:
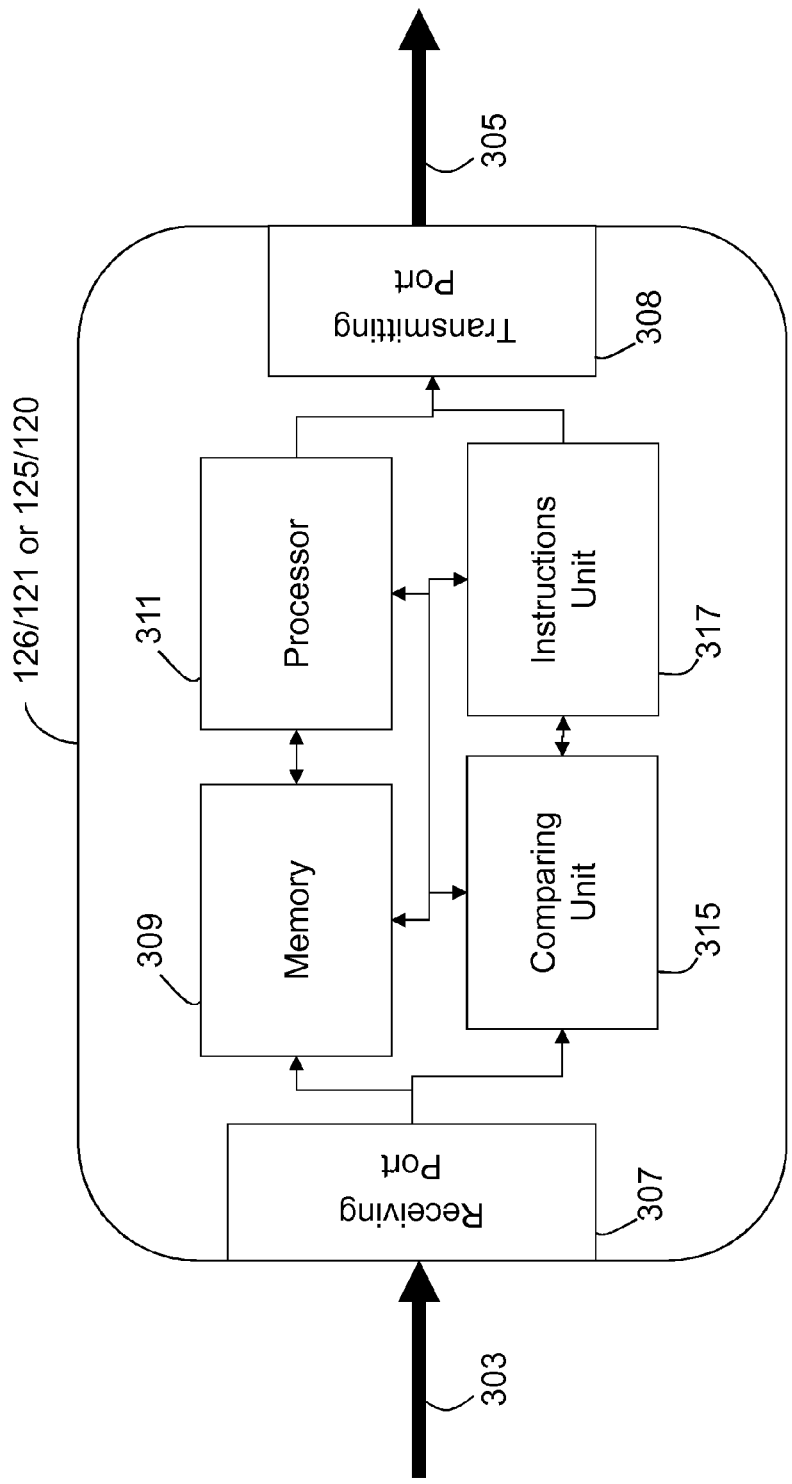
FIG. 5 is a schematic of a MME or a S4-SGSN network node, according to some of the example embodiments.

FIG. 5 is an illustrative example of a target MME 121 or a target S4-SGSN 126 network node according to some of the example embodiments. The network node 121/126 may comprise any number of communication ports, for example a receiving port 307 and a transmitting port 308. The communication ports may be configured to receive and transmit any form of communications data. It should be appreciated that the network node 121/126 may alternatively comprise a single transceiver port. It should further be appreciated that the communication or transceiver port may be in the form of any input/output communications port known in the art.

The network node 121/126 may further comprise at least one memory unit 309. The memory unit 309 may be configured to store received, transmitted, and/or measured data of any kind and/or executable program instructions. The memory unit 309 may be any suitable type of computer readable memory and may be of a volatile and/or non-volatile type.

The network node 121/126 may also comprise a comparing unit 315 that may be configured to compare QoS capabilities of a target and source system, as well as PGW/PCRF capabilities. The network node 121/126 may also comprise an instructions unit 317 that may be configured to provide instructions regarding the handling of a mobility procedure. The network node 121/126 may further comprise a general processing unit 311.

It should be appreciated that the comparing unit 315, the instructions unit 317 and/or the processing unit 311 may be any suitable type of computation unit, e.g. a microprocessor, digital signal processor (DSP), field programmable gate array (FPGA), or application specific integrated circuit (ASIC). It should also be appreciated that the comparing unit 315, the instructions unit 317 and/or the processing unit 311 need not be comprised as separate units. The comparing unit 315, the instructions unit 317 and/or the processing unit 311 may be comprised as a single computational unit or any number of units.

Figure 6:
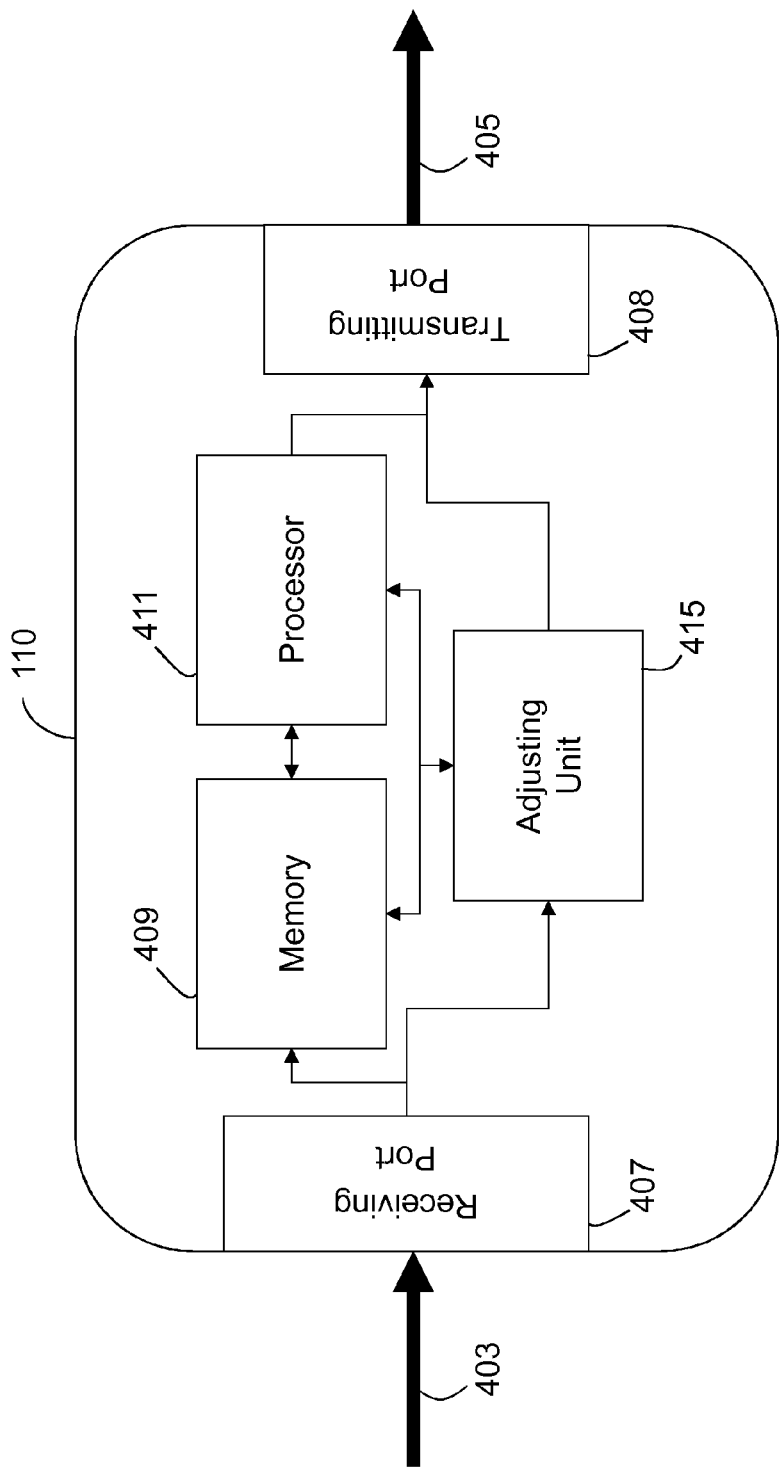
FIG. 6 is a schematic of a PGW network node, according to some of the example embodiments.

FIG. 6 is an illustrative example of a PGW 110 network node according to some of the example embodiments. The network node 110 may comprise any number of communication ports, for example a receiving port 407 and a transmitting port 408. The communication ports may be configured to receive and transmit any form of communications data. It should be appreciated that the network node 110 may alternatively comprise a single transceiver port. It should further be appreciated that the communication or transceiver port may be in the form of any input/output communications port known in the art.

The network node 110 may further comprise at least one memory unit 409. The memory unit 409 may be configured to store received, transmitted, and/or measured data of any kind and/or executable program instructions. The memory unit 409 be any suitable type of computer readable memory and may be of a volatile and/or non-volatile type.

The network node 110 may also comprise an adjusting unit 415 that may be configured to adjust QoS capabilities associated with a target system. The network node 110 may further comprise a general processing unit 411.

It should be appreciated that the adjusting unit 415 and/or the processing unit 411 may be any suitable type of computation unit, e.g. a microprocessor, digital signal processor (DSP), field programmable gate array (FPGA), or application specific integrated circuit (ASIC). It should also be appreciated that the adjusting unit 415 and/or the processing unit 411 need not be comprised as separate units. The adjusting unit 415 and/or the processing unit 411 may be comprised as a single computational unit or any number of units.

Figure 7:
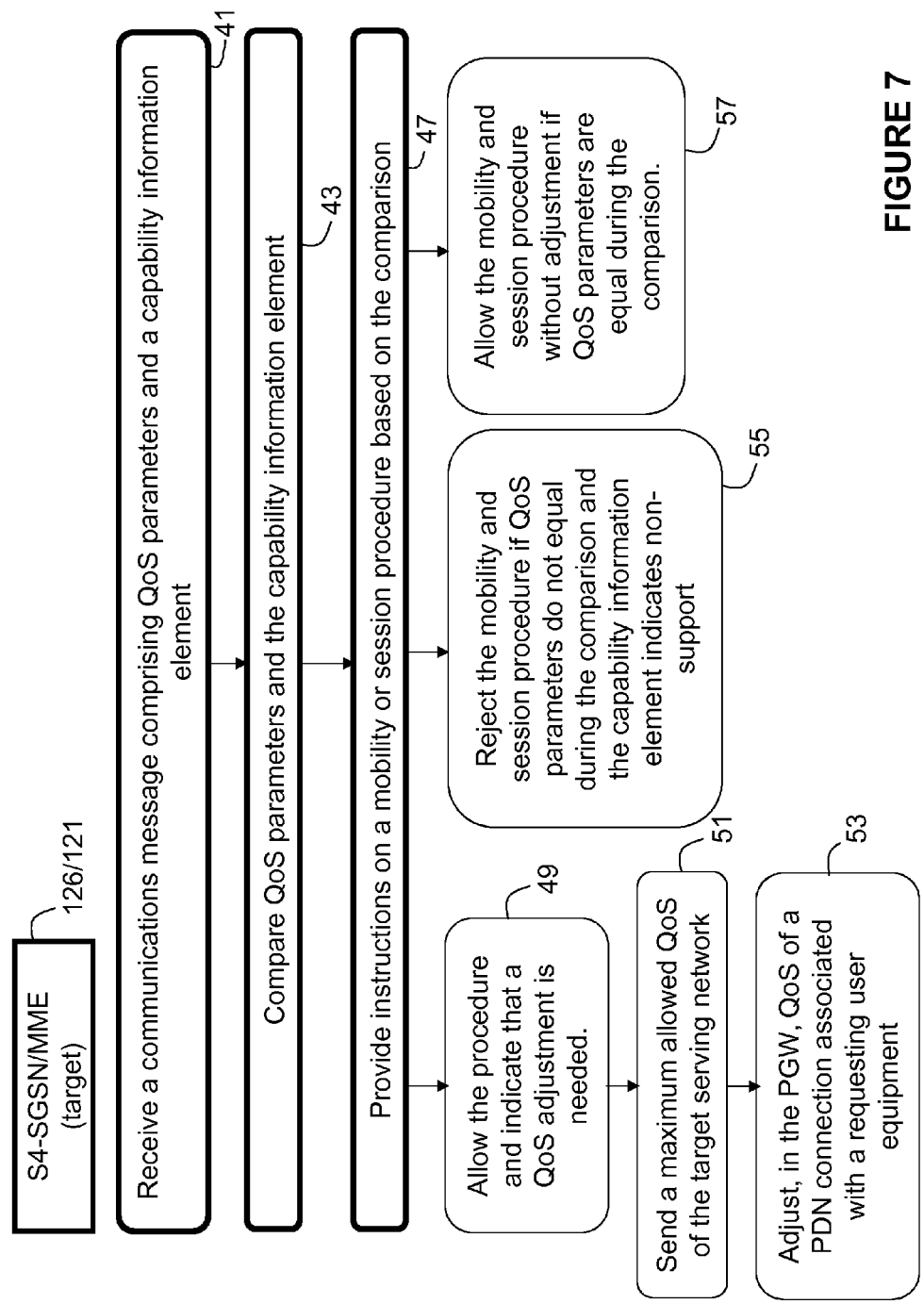
FIG. 7 is a flow diagram depicting example operational steps which may be taken by the MME of the S4-SGSN network node of FIG. 5, according to some of the example embodiments.
Figure 8:
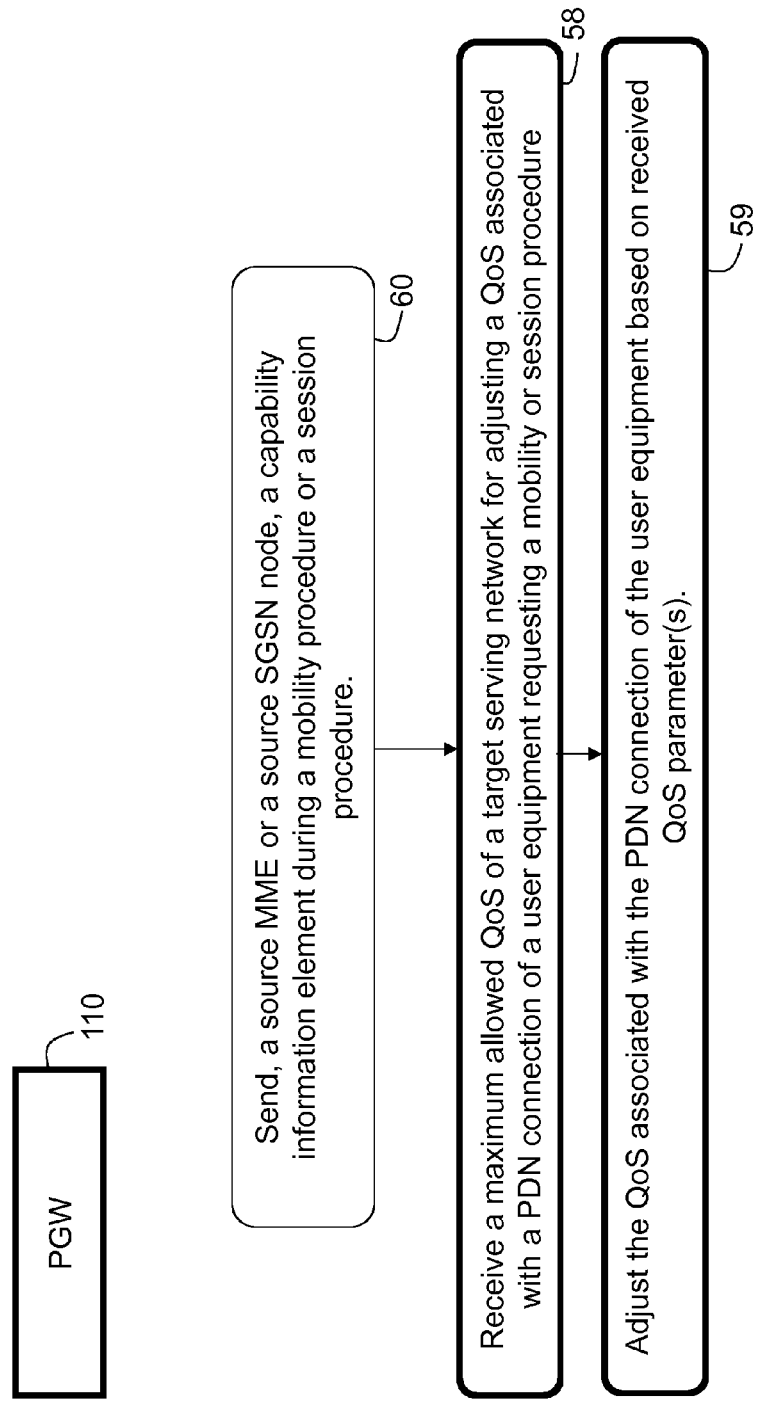
FIG. 8 is a flow diagram depicting example operational steps which may be taken by the PGW network node of FIG. 6, according to some of the example embodiments.

FIG. 7 is a flow diagram depicting example operations which may be taken by the target MME 121 or the target S4-SGSN 126 network node of FIG. 5. FIG. 8 is a flow diagram depicting example operations which may be taken by the PGW 110 network node of FIG. 6. Example operations 41-51 are performed by the target MME 121 or the target S4-SGSN 126 network node. Example operations 57 and 59 are performed by the PGW 110 network node.

Example Operation 41

According to some of the example embodiments, the target MME 121 or the target S4-SGSN 126 network node is configured to receive 41, from a source MME 120 or a source S4-SGSN 125 network node, a communications message comprising QoS parameter associated with a source serving network system. The communication message further comprises a PGW and/or a PCRF capability information element. The capability information element indicates a PGW of PCRF capability to support maximum allowed QoS handling. An example of such a communication message may be message 5 of FIG. 4. The QoS parameter associated with the source serving network may be a maximum allowed QoS of the source serving network system and/or an authorized QoS of the source serving network system. The receiving port 307 is configured to perform the receiving 41. It should be appreciated that maximum allowed QoS handling may be the ability, of the PGW and/or PCRF node, not to authorize a QoS, of a PDN connection of a requesting user equipment, which is higher than the maximum allowed QoS of the serving network.

Example Operation 43

According to some of the example embodiments, the target MME 121 or the target S4-SGSN 126 network node is further configured to compare 43 a maximum allowed QoS of a target serving network, the QoS parameter associated with the source serving network and the capability information element. The comparing unit 315 is configured to perform the comparing 43.

It should be appreciated that the maximum allowed QoS of the target serving network may be stored locally in the target MME 121 or the target S4-SGSN 126. It should also be appreciated that the maximum allowed QoS of the target serving network may also be retrieved from any other source in the radio network (e.g., a RNC, BSS or eNB network node).

Example Operation 47

According to some of the example embodiments, the target MME 121 or the target S4-SGSN 126 network node is further configured to provide 47 instructions for the mobility procedure or session procedure for each Packet Data Network connection associated with a requesting user equipment, the instructions being based on the comparing 43. It should further be appreciated that the target node may be a Gn/Gp-SGSN. The instructions unit 317 is configured to perform the providing.

It should be appreciated that the mobility procedure or session procedure may be a Roaming Area Update, a Tracking Area Update, a Handover procedure, Attach, PDN Connectivity or primary PDP context activation.

Example Operation 49

According to some of the example embodiments, the providing 47 may further comprise allowing 49 the mobility procedure of session procedure with an indication that a QoS adjustment is needed if the maximum allowed QoS of the target serving network and the QoS parameter associated with the source serving network do not equal. The instructions unit 317 may be configured to perform the allowing 49.

It should be appreciated that the allowing 49 may occur if the capability information element indicates that the PGW/GGSN or the PCRF node supports maximum allowed QoS handling, or if the source MME or the source SGSN or source SGW node does not support the capability element. For example, in the case of legacy systems, the PGW/GGSN, PCRF, MME, or SGSN may not support the maximum allowed QoS functionality described herein.

Example Operation 51

According to some of the example embodiments, the allowing 49 may further comprising sending 51, to the PGW 110 node, the maximum allowed QoS of the target serving network. The transmitting port 308 may be configured to perform the sending 51. It should be appreciated that the information may be sent in the form of a communications message, for example messages 6 and 7 of FIG. 4. It should further be appreciated that the sending may further comprise sending the maximum allowed QoS of the target serving network to PGW directly or to PGW, via a SGW node, or GGSN node via Gn/Gp-SGSN.

Example Operation 53

According to some of the example embodiments, the allowing 49 may further comprise adjusting 53, in the PGW/GGSN node, an allowed QoS associated with a PDN connection of the requesting user equipment based on the maximum allowed QoS of the target serving network. An adjustment unit 415 may be configured to perform the adjusting 53.

Example Operation 55

According to some of the example embodiments, the providing 47 may further comprise rejecting 55 the mobility procedure or the session procedure if the QoS parameter associated with the source serving network is higher than the maximum allowed QoS of the target serving network, and the capacity information element indicates that the PGW/GGSN or the PCRF node does not support maximum QoS handling. The instructions unit 317 may be configured to perform the rejecting 55.

Example Operation 57

According to some of the example embodiments, the providing 47 may further comprising allowing 55 the mobility procedure or the session procedure without an adjustment needed if the QoS parameter associated with the source serving network and the maximum allowed QoS of the target serving network are equal. The instructions unit 317 may be configured to perform the allowing 57.

Example Operation 58

According to some of the example embodiments, the PGW 110 network node is configured to receive 57a maximum allowed QoS of a target serving network, from the target MME 121 or the target S4-SGSN 126 network node, for adjusting an allowed QoS associated with a PDN connection of a user equipment 130 requesting the mobility procedure or the session procedure. It should further be appreciated that the example operation may further comprise that maximum allowed QoS of the target serving network sent from Gn/Gp-SGSN directly to PGW, or to GGSN node. The receiving port 407 is configured to perform the receiving 58. It should be appreciated that the received information may be in the form of a communications message, for example message 7 of FIG. 4.

Example Operation 59

According to some of the example embodiments, the PGW/GGSN or PCRF network node is configured to adjust 59 a QoS associated with the PDN connection of the user equipment based on the maximum allowed QoS of the target serving network and the QoS parameter associated with the source serving network. The adjustment unit 415 is configured to perform the adjusting 59.

Example Operation 60

According to some of the example embodiments, the PGW/GGSN or PCRF network node may be further configured to send 60, to a to a source MME or a source SGSN node, a PGW, or a Policy and Charging Rules Function, PCRF, capability information element, the capability information element indicating if the PGW 110 and/or a PCRF 105 node supports maximum allowed QoS handling. The sending 60 may occur during a previous mobility or previous session procedure. For example, the previous mobility or session procedure may occur when the source MME or source SGSN is functioning as a target node. The transmitting port 408 may be configured to perform the sending.

CONCLUSION

Some examples of advantages of the example embodiments described herein may be, if the information of 'PGW/PCRF capability' is sent to the target S4-SGSN/MME then the target MME/S4-SGSN will have the knowledge of whether or not there is a use send the 'Max allowed QoS' to the PGW. In other proposed solutions, the maximum allowed QoS of the target system is always sent. Therefore, the example embodiments aid in the reduction of unnecessary messages being sent. In the other case there might be a reason for a rejection of the PDN connection or disconnect of the PDN connection towards the user equipment.

For Attach procedures, the target S4-SGSN/MME may get the 'PGW/PCRF capability' and if the subscribed QoS values are larger than the current network max allowed Max allowed QoS'), the PDN connection will be allowed to be established. Otherwise, if the PDN-GW does not support 'Max allowed QoS' then there is a risk the PDN connection will be rejected by MME or SGSN. Similarly, the same example may also be applicable for Tracking area Update procedures, Routing area update procedures, and handover procedures. As SGW stores 'Max allowed QoS', then there may be less signaling on the s5/S8 interfaces.

It should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station). The example embodiments are not limited to LTE, but may apply with any RAN, single- or multi-RAT. Some other RAT examples are LTE-Advanced, UMTS, HSPA, GSM, cdma2000, HRPD, WiMAX, and WiFi.

It should also be appreciated that the QoS parameters discussed herein may comprise at least one of an EPS Bearer Level QoS and/or release 99 QoS parameters, or any other QoS parameters known in the art.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a target Mobility Management Entity (MME) or a target Serving General Packet Radio Service Support (SGSN) node for handling a mobility procedure or session procedure, the target MME node or the target SGSN node being comprised in a radio network, the method comprising:
receiving, from a source MME node or a source SGSN node, a communication message comprising a QoS parameter associated with a source serving network system, the communication message further comprising one of a Packet Data Network Gateway (PGW) or a Policy and Charging Rules Function (PCRF) capability information element, the capability information element indicating if at least one of a PGW and PCRF node supports maximum allowed QoS handling;
comparing a maximum allowed QoS of a target serving network with the QoS parameter associated with the source serving network and the capability information element; and
providing instructions to a source serving gateway (SGW) for the mobility procedure or session procedure for each Packet Data Network (PDN) connection associated with a requesting user equipment, the instructions being based the comparing.

2. The method of claim 1, wherein the QoS parameter associated with the source serving network is at least one of a maximum allowed QoS of the source serving network system and an authorized QoS of the source serving network system.

3. The method of claim 1, wherein if the capability information element indicates that the PGW or the PCRF node supports maximum allowed QoS handling or if the target MME or the target SGSN node does not support the capability information element, the providing the instructions further comprises:
allowing the mobility procedure or session procedure with an indication that a QoS adjustment is needed if the maximum allowed QoS of the target serving network and the QoS parameter associated with the source serving network are not equal; and
sending, to a PGW node, the maximum allowed QoS of the target serving network.

4. The method of claim 3, wherein, in the PGW node, adjusting an allowed QoS associated with a PDN connection of the requesting user equipment, wherein the adjusting is based on the maximum allowed QoS of the target serving network.

5. The method of claim 1, wherein providing the instructions further comprises rejecting the mobility procedure or session procedure if the QoS parameter associated with the source serving network is higher than the maximum allowed QoS of the target serving network and the capability information element indicates that the PGW or the PCRF node does not support maximum QoS handling.

6. The method of claim 1, wherein providing the instructions further comprises allowing the mobility procedure or session procedure without an adjustment needed if the QoS parameter associated with the source serving network and the maximum allowed QoS of the target serving network are equal.

7. The method of claim 1, wherein the communication message is a Context Response/SGSN Context Response, an Identity Response, or a Forward Relocation Request message.

8. The method of claim 1, wherein the mobility procedure or the session procedure is a Routing Area Update, a Tracking Area Update, a Handover procedure, Attach, PDN Connectivity or primary PDP context activation.

9. The method of claim 1, wherein the maximum allowed QoS handling is the ability not to authorize a QoS of a PDN connection of a requesting user equipment.

10. The method of claim 1, wherein the maximum allowed QoS of the target serving network is retrieved from any other source in a radio network.

11. The method of claim 10, wherein the other source in the radio network is at least one of a radio network controller (RNC) a base station subsystem, BSS, or an eNodeB, eNB, network node.

12. The method of claim 1, wherein the maximum allowed QoS handling is in-line with roaming agreements with the at least one of the PGW and the PCRF.

13. The method of claim 1, wherein the target MME or the target SGSN stores the capability information element when the user equipment moves to another MME or SGSN during a mobility procedure.

14. The method of claim 1, wherein the source SGW triggers s5/s8 signaling that includes a Modify Bearer Request comprising a target maximum allowed QoS for the at least one of the PGW or the PCRF node.

15. The method of claim 1, wherein the communication message is sent from the source MME node or the source SGSN node to the target MME node or the target SGSN node when the user equipment makes a mobility request to the target MME node or the target SGSN node.

16. The method of claim 1, wherein the comparing further includes the target MME or the target SGSN determining a maximum allowed QoS in a target serving network, and wherein the maximum allowed QoS in the target serving network is sent in the instructions to the source SGW.

17. A target Mobility Management Entity (MME) or a target Serving General Packet Radio Service Support (SGSN) node for handling a mobility procedure or session procedure, the target MME node or the target SGSN node being comprised in a radio network, the node comprising:
  a receiving port configured to receive, from a source MME node or a source SGSN node, a communication message comprising a QoS parameter associated with a source serving network system, the communication message further comprising a Packet Data Network Gateway (PGW) or a Policy and Charging Rules Function (PCRF) capability information element, the capability information element indicating if a PGW or PCRF node supports maximum QoS handling;
  a comparing unit configured to compare a maximum allowed QoS of a target serving network with the QoS parameter associated with the source serving network and the capability information element; and
  an instructions unit configured to provide instructions to a source serving gateway (SGW) for the mobility procedure or session procedure for each Packet Data Network (PDN) connection associated with a requesting user equipment, the instructions being based on the comparison.

18. The node of claim 17, wherein the QoS parameter associated with the source serving network is at least one of a maximum allowed QoS of the source serving network system and an authorized QoS of the source serving network system.

19. The node of claim 17, wherein if the capability information element indicates that the PGW or the PCRF node supports maximum QoS handling, the instructions unit is further configured to provide instructions allowing the mobility procedure or session procedure with an indication that a QoS adjustment is needed if the maximum allowed QoS of the target serving network and the QoS parameter associated with the source serving network do not equal.

20. The node of claim 19, further comprising a transmitting port configured to send the maximum allowed QoS of the target system, to the PGW node.

21. The node of claim 17, wherein the instructions unit is further configured the provide instructions for rejecting the mobility procedure or session procedure if the QoS parameter associated with the source serving network is higher than the maximum allowed QoS of a target serving network and the capacity information element indicates that the PGW or the PCRF node does not support maximum QoS handling.

22. The node of claim 17, wherein the instructions unit is configured to allow the mobility procedure or session procedure without an adjustment needed if the QoS parameter associated with the source serving network and the maximum allowed QoS of the target serving network are equal.

23. The node of claim 17, wherein the communication message is a Context Response/SGSN Context Response, an Identity Response, or a Forward Relocation Request message.

24. The node of claim 17, wherein the mobility procedure or session procedure is a Routing Area Update, a Tracking Area Update, a Handover procedure, Attach, PDN Connectivity or primary PDP context activation.

25. A method in a target Mobility Management Entity (MME) or a target Serving General Packet Radio Service Support (SGSN) node for handling a mobility procedure or session procedure, the target MME node or the target SGSN node being comprised in a radio network, the method comprising:
  receiving, from a source MME node or a source SGSN node, a communication message comprising a QoS parameter associated with a source serving network system, the communication message further comprising a Policy and Charging Rules Function (PCRF) capability information element, the PCRF capability information element indicating if a PCRF node supports maximum allowed QoS handling;
  comparing a maximum allowed QoS of a target serving network with the QoS parameter associated with the source serving network and the capability information element;
  determining an updated maximum allowed QoS of the target serving network based on the comparing; and
  providing instructions, including the updated maximum allowed QoS of the target serving network, to a source serving gateway (SGW) for the mobility procedure or session procedure for each Packet Data Network (PDN) connection associated with a requesting user equipment, the instructions being based on the determining.

* * * * *

UNITED STATES PATENT AND TRADEMARK OFFICE
CERTIFICATE OF CORRECTION

PATENT NO. : 9,078,175 B2
APPLICATION NO. : 13/315384
DATED : July 7, 2015
INVENTOR(S) : Yang et al.

It is certified that error appears in the above-identified patent and that said Letters Patent is hereby corrected as shown below:

Specification

In Column 7, Line 9, delete "a 51" and insert -- a S1 --, therefor.

In Column 11, Line 1, delete "Max" and insert -- ('Max --, therefor.

Signed and Sealed this
Eighth Day of March, 2016

Michelle K. Lee
*Director of the United States Patent and Trademark Office*